Patented Oct. 12, 1943

2,331,598

UNITED STATES PATENT OFFICE 2,331,598

CAPSULATION OF MATERIALS CONTAINING ALKALI HALIDES

Robert D. Cook, Grosse Pointe, and Sereck H. Fox, Birmingham, Mich., assignors to Gelatin Products Company, Detroit, Mich., a copartnership consisting of Margaret L. Scherer and Robert P. Scherer, and Margaret L. Scherer as trustee for Josephine L. Scherer, Robert P. Scherer, Jr., Karla Scherer, and John Stephen Scherer No Drawing. Application June 6, 1942, Serial No. 446,162

12 Claims. (Cl. 99—143)

This invention relates to improvements in capsulation of materials containing alkali halides. It relates particularly to the capsulation of such alkali halide containing materials within gelatin capsules wherein either in the capsule shell or in the content material or both an appreciable amount of moisture is present.

Alkali halide such as NaCl and other chlorides, NaBr and other bromides, NaI and other iodides, and many other highly ionized inorganic substances have a highly deleterious action upon gelatin in the presence of water. When content materials containing such alkali halides are capsulated in the soft elastic gelatin capsules known to commerce, which gelatin contains an appreciable quantity of water which may vary from 3% to 10%, the alkali halide in the presence of the water tends to break down the shell, frequently penetrating therethrough and resulting in leakage of the content materials.

An example of a capsule of this character is a capsule containing a concentrated food mixture such as soup stock or a bouillon mixture. Such a capsule contains ordinary table salt as a necessary condiment and it is present in an appreciable amount. One capsule of this character is sufficient, when placed in a cup of hot water, to produce a cup of soup or bouillon.

It has been found that such a mixture containing salt may be capsulated and that the salt will not attack the gelatin shell if the following procedure is pursued. The required amount of salt for the desired batch of content material is dissolved in water to the saturation point of the solution. For example, 15 lbs. of salt may be dissolved in about 45 lbs. of water. A suitable quantity of gelatin is then dissolved in water and these proportions may be equal amounts of gelatin and water. These two solutions are then mixed together in such proportions as to produce the desired proportion of salt and gelatin in the final mixture after the water has been extracted. This final mixture may be on a basis of 50% salt and 50% gelatin or 75% salt and 25% gelatin or even a greater proportion of salt. The two solutions are thoroughly mixed together. The salt appears to be completely in solution. In the 50%—50% mixture, 15 lbs. of salt were dissolved in 45 lbs. of water and 15 lbs. of gelatin were dissolved in 15 lbs. of water and these two solutions were then thoroughly mixed.

The solution resulting from the mixing of the two solutions is then subjected to a spray drying operation. In the 50%–50% mixture solution it was necessary to add an additional amount of water to accomplish proper spray drying and obtain discrete particles of the mixture. As a result of the spray drying operation relatively dry and relatively small particles of a mixture of salt and gelatin are formed. These particles may be very fine and may approach a microscopic size and it is preferred that they be small enough to pass through a 75–100 mesh screen. The moisture content of the particles is low and might vary from 1–5%. Within such range the particles are characterized as substantially dry or substantially anhydrous.

The salt might be described as immobilized within a gelatin matrix or coated thereby or aggregated therewith. These fine particles of salt and gelatin resulting from the spray drying are then added to the content material which it is intended to capsulate and they are added in the amount required to provide the desired amount of salt. The entire mixture is then capsulated in gelatin capsules. The salt is in a finely divided state and is held bound by the gelatin in small fine particles and does not deleteriously attack the gelatin shell even though the shell may contain from 3–10% of moisture. Two typical concentrated food mixtures used as capsule content mixtures and containing salt are as follows:

A typical bouillon formula:

| | Grams |
|---|---|
| Bouillon paste | .604 |
| Invert sugar syrup (nulomoline) | .604 |
| Salt gelatin mixture; 75% salt, 25% gelatin | .121 |
| Water | .121 |

Second mixture:

| | Grams |
|---|---|
| Dried beef extract | .520 |
| Sodium glutamate | 1.30 |
| Salt gelatin mixture 50–50 | 1.600 |
| Celery powder | 0.070 |
| Onion powder | 0.017 |
| White pepper | 0.013 |
| Lecithin | 0.150 |
| Fully hydrogenated vegetable oil (Cotoflake) | 0.064 |
| Partially hydrogenated vegetable oil (Primex) | 1.000 |
| Corn oil | 1.500 |

Other mixtures containing other alkali halides as hereinabove suggested may be prepared and capsulated by first preparing the solution of the gelatin and the salt and then recovering the salt gelatin mixture as before described and adding such mixture in the form of fine particles to the content material to be capsulated.

The finely divided dry particles of the salt gelatin mixture might be recovered by any method other than spray drying method, such as drum drying or the like, which other method resulted in the production of small dry discrete particles wherein the salt was bound in the gelatin.

What we claim:

1. That method of preparing an alkali halide for capsulation within a gelatin capsule comprising dissolving such halide within a concentrated gelatin solution and then spray drying the solution producing finely divided substantially dry particles of such mixture for capsulation.

2. That method of preparing an alkali halide for capsulation within a gelatin capsule comprising dissolving the alkali halide within a gelatin solution and thereafter recovering the salt and gelatin as finely divided dry mixture particles from the solution for capsulation.

3. In that method of capsulating an alkali halide within a gelatin capsule the step of capsulating finely divided dry particles of a homogeneous salt-gelatin mixture within a gelatin shell wherein moisture is present, said salt gelatin mixture being characterized by the salt being bound by the gelatin in small fine particles.

4. The method defined in claim 2 where the alkali halide is NaCl.

5. The method defined in claim 3 wherein the alkali halide is NaCl and the dry particles of salt-gelatin mixture are spray dry particles.

6. That method of capsulating sodium chloride in a gelatin capsule which contains a small quantity of water which comprises dissolving the salt in a water solution, dissolving gelatin in a water solution, mixing said two solutions together, recovering the salt and gelatin as a substantially dry mixture in the form of finely divided discrete particles from the solution by a spray drying operation, mixing said particles with content material to be capsulated, capsulating the content material containing said particles within a soft elastic gelatin shell.

7. A gelatin capsule wherein moisture is present, said capsule enclosing content material, which content material includes as a component a granular mixture of gelatin and an alkali halide mixed together within the granule.

8. A gelatin capsule carrying content material, said capsule having a soft elastic capsule shell, said content material including sodium chloride as a component, said sodium chloride being incorporated in the content material in the form of finely divided dry particles of a salt gelatin mixture.

9. A component of content material for capsulation within a gelatin capsule being a dry discrete particle of a mixture of an alkali halide and gelatin.

10. The dry discrete particle defined in claim 9 characterized in that such particle is of a size to pass through a 75-100 mesh screen.

11. The dry discrete particle defined in claim 9 wherein the alkali halide component is sodium chloride.

12. That method of capsulating sodium chloride in a gelatin capsule which contains a small quantity of water which comprises mixing finely divided spray dry discrete particles of a salt-gelatin mixture with the content material to be capsulated, capsulating the content material containing said particles within a soft elastic gelatin shell.

ROBERT D. COOK.
SERECK H. FOX.